June 30, 1964  J. E. BAYHA ETAL  3,139,580
PEAK READING METER UTILIZING PERIODICALLY
INTERRUPTED LOCKING CONTACT
Filed Dec. 7, 1960

*INVENTORS*
JACK E. BAYHA
GEORGE E. HAMMOND
BY

ATTORNEY

3,139,580
PEAK READING METER UTILIZING PERIODICALLY INTERRUPTED LOCKING CONTACT

Jack E. Bayha, Chesterland, and George E. Hammond, Cleveland, Ohio, assignors to Assembly Products, Inc., Chesterland, Ohio, a corporation of Ohio
Filed Dec. 7, 1960, Ser. No. 74,275
5 Claims. (Cl. 324—103)

The present invention relates to improvements in electric meters and more particularly to constructions and circuitry for providing retention of a peak reading indication.

In the field of measurements it is often desired to have a meter hold the highest reading it makes over a given period of time. Doing this usually requires two pointers, one continuously responsive to signal and another driven upward by the first to be responsive to peak reached by the signal pointer, but operation of the latter damps the operation of the former, and heretofore the methods of obtaining peak readings have been inaccurate and unreliable or else very expensive.

It is an object of the present invention to provide simple and inexpensive means for overcoming the above mentioned difficulties.

Another object of the invention is to provide an improved peak reading meter.

Broadly speaking, this application has its basis in our invention or discovery that an ordinary locking coil-locking contact type of meter can be used as an efficient maximum reading meter by providing locking coil current which is self-interrupting while the normally manually adjustable pointer is provided with a suitable degree of light drag action permitting it to be pushed by repeated locking effect actions, and to remain in the position last held until and unless again contacted by the meter pointer. Thus arrangements according to the invention may be quite inexpensively made to eliminate false action and errors, as will hereafter be explained.

Other objects and advantages will become apparent and the invention may be better understood from consideration of the following description taken in connection with the accompanying drawing, in which.

Figure 1:
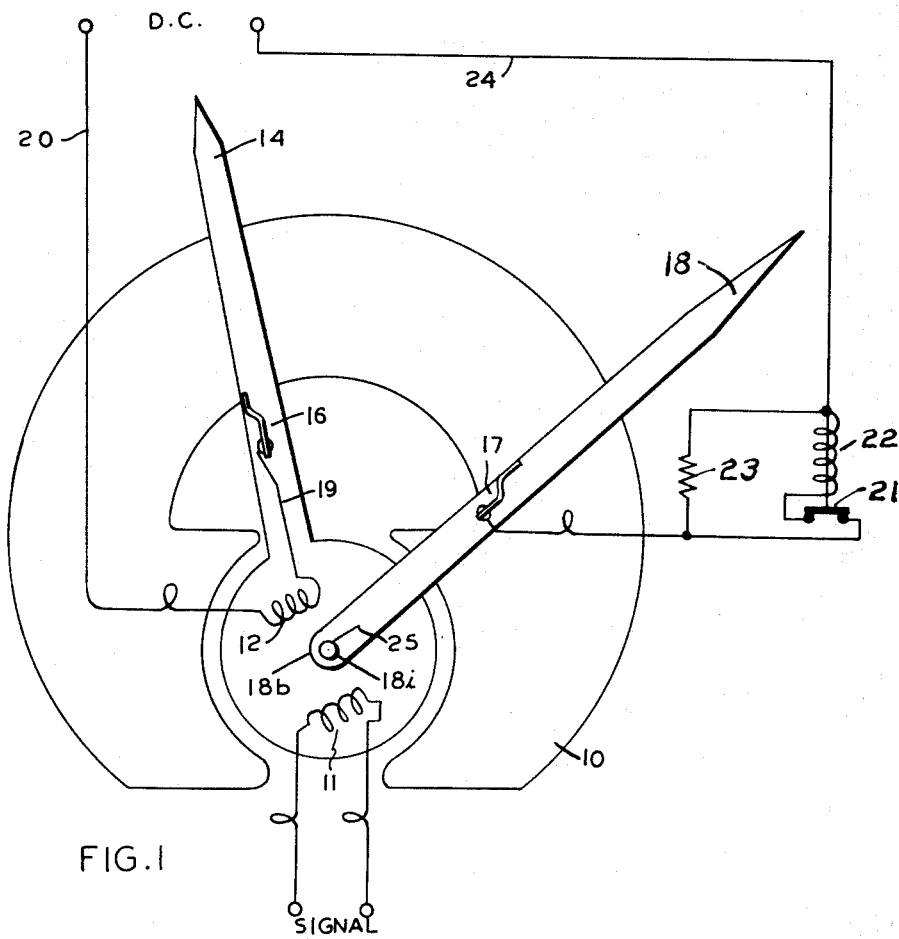
FIG. 1 is a diagrammatical illustration of a preferred arrangement for the retention of meter peak readings.

In FIG. 1 a contact meter is shown provided with a permanent magnet 10 in the field of which a sensitive coil indicated diagrammatically at 11 turns responsive to changes in the input signal, coming, for example, from a thermocouple. Mounted to rotate with coil 11 is a boosting coil 12 which provides, at least for one limit of travel, an additional, or boosting, torque. The coil assembly may be mounted on steel pivots and turn in jewel bearings with the action restrained by hair springs which may also serve to carry current to and from the moving coil assembly. For continuous indication a pointer 14 may cooperate with a suitable marked scale plate (not shown) and a portion of the pointer is a spring mounted contact 16 which mates with a relatively stationary contact 17, the contact 17 being spring mounted on a pointer 18 which in accordance with the present invention serves as a maximum deflection or peak reading pointer. The boosting coil 12 is connected to the indicating pointer 14 contact 16 by a lead 19.

With continued reference to FIG. 1, preferably direct current is conducted via lead 20 through the boosting coil 12 and lead 19 to contact 16 (on meter pointer 14) when signal coil 11 current is such as to cause meter pointer 14 to reach peak reading pointer 18 so that contact 16 will conduct current to contact 17. A boosting current self-interrupting means in this preferred embodiment comprises a normally closed relay having a contact pair 21 in series with relay winding 22 for actuating contact 21, and may include a resistor 23 shunting the series circuit including relay coil 22 and contact pair 21. When contact 17 is energized by the touching of contact 16, current passes through shunt resistor 23 and, via the normally closed contact pair 21, through relay coil 22, and returns to the power supply through lead 24.

The sequence of actions in the self-interrupting circuit of FIG. 1 when contacts 16 and 17 meet is as follows: The surge of current through boosting coil 12 forces contact 16 more vigorously against contact 17, storing mechanical energy in the deflection of the contact springs, while simultaneously relay coil 22 begins to build up attraction for the armature carrying contacts 21. When sufficient attractive force exists, contacts 21 open. The opening of contacts 21 greatly reduces the boosting current through boosting coil 12. Much of the mechanical energy stored in contacts 16 and 17 as contact spring force is now released. This plus the normal returning force of the meter movement springs, now being less than the sum of force due to current in signal coil 11 plus force due to residual current in boosting coil 12 passed by resistor 23, causes the meter movement pointer 14 to move away from peak reading pointer 18. Contact 16 now draws away from contact 17, and relay coil 22 is deenergized, permitting contact pair 21 to reclose. If signal coil 11 current is such as to return pointer 14 toward peak reading pointer 18, when the meter movement momentum imparted by the described events has been dissipated, pointer 14 will now return toward pointer 18, causing those events to be repeated.

In conventional meter-relays the friction of the bearing 18b portion of pointer 18 against stationary mounting journal 25 at interface surface 18i is adjusted so that pointer 18 is easily moved by hand, but impossible to be moved by the meter-movement forces. We have found that by adjustment of the pressure on interface surface 18i which may be augmented by use of a suitable lubricant at that surface, the friction may be adjusted so that the repeated hammerlike blows of the pointer 14 via contact springs 16 and 17 against pointer 18 can move it in small discrete increments, while the same adjustment is such that pointer 18 will not be moved by gravity or normal accelerations to which a meter normally may be subjected. When it is desired to reset pointer 18, this easily may be done manually by mechanisms similar to conventional pointer adjusting mechanisms except that, of course, the mechanism must not interfere with or add friction to the previously described conditions.

It is apparent that the action described is enhanced as the current-interruption-followed-by-the-return-to-contact frequency is increased. Each cycle moves the pointer 18 a small, discrete amount, and ability of the pointer 18 to be pushed beyond pointer 14 in response to normal signal change rates is a measure of the usefulness of the device. We have been able to attain full scale movement of pointer 18 in about 0.25 second, but this is attained by permitting individual discrete movements to become rather large, with a consequent tendency for pointer 18 overshoot and indication of somewhat high readings. A reasonable practical compromise at the present state of the art appears to be about 1.0 second, which adjustment permits pointer 18 to accurately register most readings which D'Arsonval meters can follow.

It will be noted that actual operating frequency is a function not only of supply voltage and the characteristics of relay coil 22 together with the armature associated with contacts 21, but also of meter ballistics and the springing characteristics of contacts 16 and 17. In a given set of circumstances, variation of the value of resistor 23 can materially improve the operation of the circuit of FIG. 1, since by decreasing the reduction in boosting coil current caused when contacts 21 open, the force with which pointer 14 is forced away from pointer 18 by the energy stored in contact springs 16 and 17 may be decreased, producing faster cycling.

It will be understood that the action described for FIG. 1 may be combined with control action without exceeding the scope and intended field of use of our invention.

Figure 2:
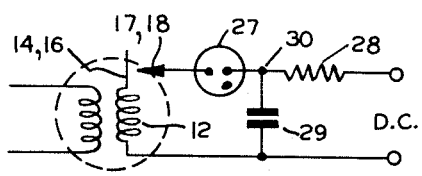
FIG. 2 illustrates a modification.

Referring now to FIG. 2, we have shown a particularly simple, low cost, self-interrupting circuit which may be used advantageously in the practice of the present invention for certain applications. Like parts are like numbered as in FIG. 1, and a cold cathode discharge tube 27, together with a resistor 28 and capacitor 29 replaces the relay-resistor parts 21, 22 and 23 used for current interruption in FIG. 1. The tube 27 may be a neon glow lamp (see U.S. Patent 2,850,683, issued Sept. 2, 1958, on an application filed by John D. Saint-Amour), and with the arrangement of FIG. 2 when the signal coil 11 is sufficiently energized to cause contact 16 to mate with contact 17, the gas discharge tube 27 conducts, because the power supply previously will have charged capacitor 29 through resistor 28 so that point 30 will have higher than ionizing potential. Since the gas discharge tube 27 has very low resistance once it is ionized, capacitor 29 will discharge through it via contacts 16 and 17. When capacitor 29 has partly discharged, the boosting coil current falls since resistor 28 has high enough resistance to supply only a small amount of current while capacitor 29 is shunted by boosting coil 12. As the boosting current falls, energy mechanically stored in contacts 16 and 17 is released, driving pointer 14 away from pointer 18 ultimately separating contacts 16 and 17. This permits capacitor 29 to recharge in readiness for the next cycle of operation, the time required for recharge being governed by supply voltage, and the values of resistor 28 and capacitor 29.

Figure 3:
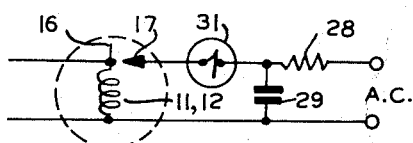
FIG. 3 shows another modification.

FIG. 3 shows a schematic diagram of a self-interrupting circuit very similar to that of FIG. 2, except that a single coil 11, 12 is used both for signal and boosting and the discharge tube 27 of FIG. 2 has been replaced with a two terminal 4 layer PNPN, solid state device 31, sometimes called a Shockley transistor. The characteristics of this device are somewhat similar to those of a gas discharge tube; when the voltage across the device exceeds a critical value characteristic of the device, its internal resistance abruptly drops to a relatively very low value, but when the current through it subsequently drops below a critical value it abruptly re-acquires its relatively very high value of internal resistance. Thus, this device in the circuit of FIG. 3 will cause self-interrupting in a manner quite analogous to that described above in connection with the circuit of FIG. 2.

It is apparent that other self-interrupting arrangements can be used in combination with a meter-relay having energy-storing spring means between a signal responsive pointer and a peak position holding pointer and having suitably - adjusted - peak-holding-pointer-bearing-friction-characteristics, without exceeding the scope and intention of our invention. For example, a periodically interrupted and/or reversing (A.C.) supply might be used. Also the action described can be provided in a contact meter having only one moving coil winding (11, 12 as in FIG. 3) used for both signal response and boosting action, and there might be one, two or no contact springs depending on the springiness of the meter movement.

It will be understood that the terms "peak" and "maximum" and the like, as used in this specification and claims are used broadly, to include arrangements where extreme signal-responsive pointer excursions in any scale, or pointer movement, direction are held for later reading, including upscale excursions, downscale excursions, and excursions in both directions with one or more position holding pointers, and with no, one or a plurality of separate boosting coils.

Many ways of resetting the position holding pointer to any desired initial position, including electrical resetting actuation, will be evident to those skilled in the art, and will be within the scope and intent of our invention.

Also, without exceeding the scope and intent of our invention, the meter may be responsive to other than electrical signals, such as to a pneumatic or hydraulic diaphragm mechanism and still include a magnet and booster coil, the electrical contacts, the self-interrupting means, the mechanical energy storage means, and a properly adjusted frictionally mounted maximum reading pointer, for while we have illustrated and described particular embodiments, various modifications may obviously be made without departing from the true spirit and scope of the invention which is intended to be defined by the accompanying claims taken with all reasonable equivalents.

We claim:

1. A meter capable of holding and exhibiting until reset a peak reading, said meter comprising a D'Arsonval galvanometer having a moving coil means in the field of the permanent magnet, means including connections for applying a signal to said coil means to cause rotation thereof according to signal applied, said coil means supporting a first pointer carrying a first electrical contact whose position is thus signal responsive, a second pointer having a second electrical contact arranged to mate with said first contact, means including a source of booster voltage connected in circuit with the contacts and connected to apply to the coil means an additional current upon contact mating to provide an additional force tending to press said contacts together, means including a resilient mounting of said contacts for storing a portion of the energy expended in said further pressing together of the contacts, means for interrupting the continuity of said booster voltage for releasing said stored energy, the second pointer having a frictionally adjusted action mounting whereby a portion of the energy expended at the time of said further pressing together of said contacts causes rotation of said second pointer while in contact with said first pointer whereas the releasing of the energy stored in the resilient mounting causes separation of said first pointer from said second pointer with the result that a higher signal will thereafter be required to again cause contact mating.

2. A peak reading meter construction of circuitry comprising a contact making D'Arsonval galvanometer instrument having a rotatable signal coil means and a rotatable booster coil means, said means together having a pointer carrying a first contact resiliently mounted and connected in series with the booster coil means, means including connections for supplying a signal to the signal coil means, a second contact resiliently mounted and arranged to mate with the first contact, pointer means carrying the second contact and frictionally mounted so as to rotate during mating of said contacts, means including connections from a supply source for supplying current through a circuit including said booster coil means and said contacts when said contacts mate, and means for periodically reducing said booster coil current to allow said resiliently mounted contacts to separate and thus break said circuit.

3. Peak reading meter construction and circuitry as in claim 2 further characterized by the means for periodically reducing said booster coil current comprising a relay having a coil and contacts which are closed when the coil is de-energized, coil and contacts being in series, and a resistor around the series connection of coil and contacts.

4. Peak reading meter construction and circuitry as in claim 2 further characterized by the means for periodically reducing said booster coil current comprising a cold cathode discharge tube, a resistor in series between said tube and said supply source, and a capacitor connected from a point intermediate said resistor and said tube to the return lead of the supply.

5. A meter having a permanent magnet and a signal responsive coil means for producing a first mechanical force and having a signal pointer rotatable about an axis as a result of said first force and another pointer rotatable about said axis, a pair of resiliently mounted electrical contacts one mounted on each of said pointers, rotatable coil means connected in circuit with the contacts for producing an additional force upon application of a current, said other pointer having a frictional bearing mounting adjusted so that said other pointer will move in response to said additional force, and self-interrupting means for applying said current to said rotatable coil means through said contacts when closed.

References Cited in the file of this patent

UNITED STATES PATENTS

| | | |
|---|---|---|
| 2,320,208 | Wurth | May 25, 1943 |
| 2,373,202 | Snell | Apr. 10, 1945 |
| 2,464,886 | O'Reilly | Mar. 22, 1949 |
| 2,850,683 | Saint-Amour | Sept. 2, 1958 |
| 2,914,712 | Chamberlain | Nov. 24, 1959 |
| 2,947,918 | Hamilton | Aug. 2, 1960 |